United States Patent [19]

Vegeais

[11] Patent Number: 5,453,824
[45] Date of Patent: Sep. 26, 1995

[54] ELECTRO-PHOTOGRAPHIC METHOD AND DEVICE WITH THERMAL FIXING WITH REDUCED NOISE

[75] Inventor: Patrick Vegeais, Fourqueux, France

[73] Assignee: Societe d'Applications Generales d'Electricite et de Mecanique SAGEM, France

[21] Appl. No.: 170,912

[22] Filed: Dec. 21, 1993

[30] Foreign Application Priority Data

Dec. 21, 1992 [FR] France .................. 92 15361

[51] Int. Cl.⁶ ................................ G03G 15/20
[52] U.S. Cl. .......................... 355/285; 219/216
[58] Field of Search ...................... 355/282, 285, 355/286, 289, 290, 291; 219/216

[56] References Cited

U.S. PATENT DOCUMENTS

| | | | |
|---|---|---|---|
| 4,303,334 | 12/1981 | Haupt et al. | 355/282 X |
| 4,801,974 | 1/1989 | Suto et al. | 355/290 X |
| 5,063,459 | 11/1991 | Nakatani et al. | 355/285 X |
| 5,081,493 | 1/1992 | Miyasaka | 355/285 X |
| 5,151,573 | 9/1992 | Masuda | 355/285 X |
| 5,307,132 | 4/1994 | Tsuchiya | 355/285 X |
| 5,321,428 | 6/1994 | Dornier | 355/285 X |
| 5,325,164 | 6/1994 | Tai et al. | 355/282 |

FOREIGN PATENT DOCUMENTS 316010  5/1989  European Pat. Off. .

OTHER PUBLICATIONS

Patent Abstracts of Japan—vol. 16, No. 508, (E–1282), Oct. 20, 1992 & JP-A-04,189,063, (Brother Ind Ltd.), Jul. 7, 1992—Abstract.
Patent Abstracts of Japan—vol. 10, No. 179, (E–414), Jun. 24, 1986 & JP-A-61,029,261, (Canon, Inc.), Feb. 10, 1986—Abstract.
Patent Abstracts of Japan—vol. 13, No. 341, (P–907)(3689), Jul. 31, 1989 & JP-A-01,100,583, (Tokyo Electric Co. Ltd.), Apr. 18, 1989—Abstract.

*Primary Examiner*—Fred L. Braun
*Attorney, Agent, or Firm*—Larson and Taylor

[57] ABSTRACT

An electro-photographic printing device has a development location where toner is transferred onto a drum in proportion to the amount of light charges on the drum and a transfer location where toner is transferred from the drum to a sheet of paper. A heater unit for fixing the toner by heating it to a predetermined temperature has a heater and a blower for heat removal. Responsive to a call for printing, data to be printed are stored in a memory. The heater is energized until a set temperature is obtained. Printing is initiated as soon as the set temperature is obtained. The blower is stopped after heating has been discontinued, after printing has been completed, until there is a new call.

8 Claims, 1 Drawing Sheet

ELECTRO-PHOTOGRAPHIC METHOD AND DEVICE WITH THERMAL FIXING WITH REDUCED NOISE

BACKGROUND OF THE INVENTION

The invention relates to methods and devices for electro-photographic writing.

In widely used facsimile apparatuses, a light beam, typically delivered by a laser diode, is modulated by an input video signal and is focussed on a rotating photosensitive drum. The light beam generates, at each point of the drum, an electrostatic charge which represents the amount of received light. Dry toner in quantity proportioned to the deposited charges is transferred on the photosensitive drum. Then the dry toner is transferred on a paper sheet by an electrical field. The toner is fixed on the paper by pressing and heating it to a sufficient temperature.

The invention is particularly suitable for use in a facsimile apparatus for printing on regular paper. However it is also applicable to other systems and for instance to printers for connection with a personal or home computer.

In most electro-photographic devices using laser writing and thermal fixing, the thermal fixing means are continuously maintained at the required temperature for being immediately available at every instant. Heat generated by the fixing means should be exhausted to atmosphere for avoiding bringing other elements of the printer to an excessive temperature. For that purpose a blower is used and operates continuously, in stand-by conditions as well as in operating conditions. The sound level of the blower, which frequently exceeds 43 dB, is acceptable when the printer is in a noisy environment. On the other hand, it is not acceptable any longer for a desk top low-cost facsimile apparatus. Due to that sound level, facsimile apparatuses for that purpose have used thermal paper printers, in spite of the drawbacks of that substrate (high cost and difficulty of long term storage). A similar problem exists for a printer located close to a personal or home micro-computer.

It has also been proposed (U.S. Pat. No. 5,063,459 to Nakatani et al) to maintain the fixing device at a reduced temperature when a facsimile apparatus is in stand-by conditions, for reducing power consumption. However, that does not reduce the noise level associated with continuous operation of a heat removal blower.

SUMMARY OF THE INVENTION

It is an object of the invention to reduce the noise level of an electro-photographic apparatus with thermal fixing when the latter is not in operation. For that purpose, there is provided a method comprising the steps of storing data to be printed following receipt of a call to receive data, initiating heating of the thermal fixing means if the temperature of the latter is lower than a predetermined required temperature, and beginning printing as soon as the required temperature is reached.

There is also provided a printing device apt to implement the above-defined method. The device comprises:

a light source delivering a light beam; a photosensitive rotative drum;

means for modulating said light beam and causing said light beam to scan said photosensitive drum axially;

means for transferring electrical charges onto said drum in proportion to an amount of light at each point of the drum;

development means for transferring toner onto said drum in proportion to the amount of light charges on said drum;

means for transferring said toner from said drum to a paper sheet;

means for fixing said toner by pressing said paper and heating it to a predetermined temperature, said fixing means having heating means and a blower for heat removal; and means responsive to a printing request for storing data to be printed in a memory, energizing said heating means until said temperature of said fixing means have been obtained, initiating operation of said light beam and rotation of said drum as soon as said temperature is obtained and stopping said blower after said heating has been discontinued.

The invention will be better understood from the following description of a particular embodiment, given as an example only.

DETAILED DESCRIPTION OF A PREFERRED EMBODIMENT

Figure 1:
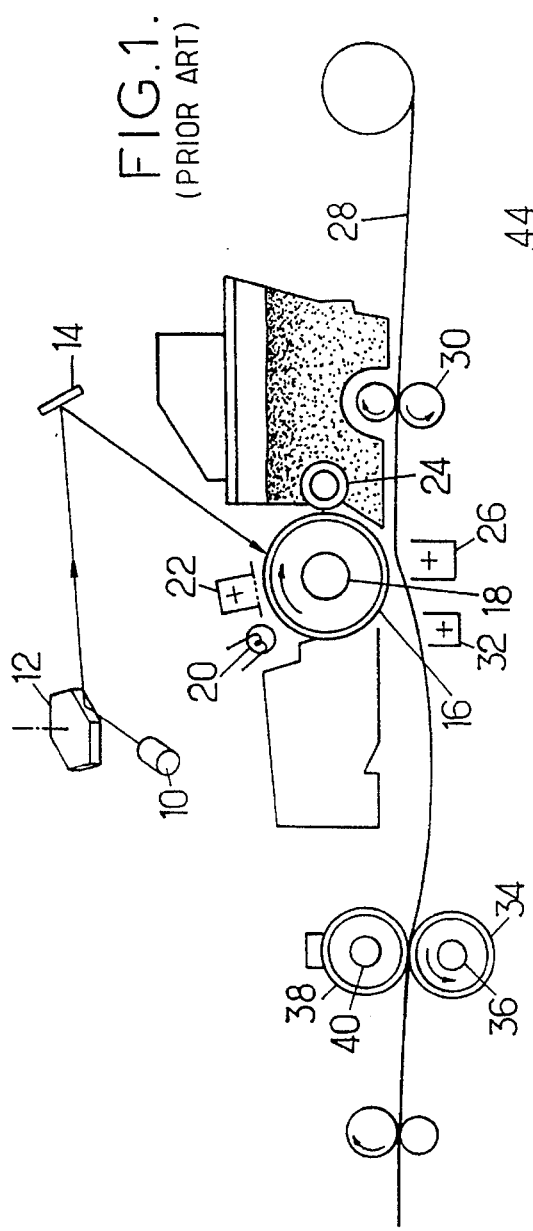
FIG. 1 is a schematic representation of a printing device having a general construction which is currently used in laser printing facsimile apparatuses.

The printer of a facsimile apparatus whose general construction is schematized in FIG. 1 comprises a light source 10 (typically a laser diode) which delivers a beam which is focussed, then received by a polygon mirror 12 for line scanning and directed by a folding mirror 14 onto a photosensitive drum 16 which is rotated, typically continuously rather than step-by-step, by an electric motor 18. The drum, typically having a diameter of some centimeters, is covered with a layer of photoconductive material (organic material or selenium). Upon radiation, each generatrix of the drum 16 in turn confronts a lamp 20 for removing residual negative charges, then a Corona generator 22 for uniformly depositing negative electrostatic charges on the drum 16 and then a location where exposure to the light beam takes place. The beam removes charges from the surface of the drum at each point in proportion with the level of radiation received by that point. The invention would also be applicable to a printer which makes use of positive charges and an appropriate dry toner.

Each generatrix of the drum in turn then passes through a development location where the latent electrostatic image on the photosensitive drum is transformed into a visible image by transfer of toner. The toner has typically two components. It is carried by a magnetic roller which rotates within a sleeve 24. The toner adheres to the drum 16 on the zones which were exposed to the light beam, with a density which is in proportion to the degree of exposure. At a transfer location where a generator 26 maintains a Corona discharge, the dry toner is transferred onto a paper sheet 28 moved by a paper feeding device 30. The paper sheet, from which the charges were possibly removed at a location 32, passes through a fixing device. The dry toner is fixed by pressing and heating it. For that purpose, the device comprises a pressing roller 34 driven by a motor 36 (or more frequently by a linkage from the main motor 18) and a heating or thermal fixing roller 38. A central heater 40, typically a halogen lamp, maintains the heating roller at a regulated temperature, about 500° C. with the usual toners.

A sensor (not shown) detects the temperature of drum 38 and switches on the lamp as soon as the temperature is under a predetermined value $\Theta_0$. The lamp is switched off when another temperature $\Theta_1$, higher than $\Theta_0$, is exceeded.

For avoiding that heat from the drum 38 and lamp 40 affects other components of the facsimile apparatus, means should be provided for removing heat. On the present day facsimile apparatuses, they consist of an electric blower (not shown on FIG. 1) which continuously operates when the facsimile apparatus is energized, in stand-by condition as well as when printing or transmitting. The sound level of such a blower is typically between 43 and 48 dB and includes relatively high frequencies. It is consequently a nuisance in an office room.

According to the invention, the blower is only energized during printing periods, which are particularly unfrequent for auxiliary office telefax devices.

For that purpose, heating of the thermal fixing means is stopped except for printing. Consequently, the blower may also be stopped. The blower may be switched off, after printing and heating have ended, either after a predetermined period, or as soon as a thermal probe or sensor indicates that the temperature in the vicinity of the drum has decreased under a predetermined value $\Theta_2$, lower than $\Theta_0$.

As a counterpart, that type of operation requires that, upon reception of a message, data be stored until energization of the heating means has increased the temperature of the thermal fixing roller up to the set temperature $\Theta_0$. The thermal inertia of the drum of a low cost facsimile apparatus is low and the temperature of the drum may be increased from ambient temperature to $\Theta_0$ in a time period which may vary from some tens of seconds to about one minute, when a halogen lamp of high power (several hundreds of Watts) is used. Heating may be initiated from the start of the connection protocole, which requires 4 to 10 seconds for a facsimile apparatus of group 3. A static or dynamic RAM having a capacity of some hundreds of kbytes is consequently sufficient. More precisely, for a facsimile apparatus designed for printing a document received at a rate of 14.4 kbytes/s, with a maximum duration of pre-heating of 60 seconds, a minimum storage capacity of 100 k-bytes is necessary. Most facsimile apparatuses available on the market have a minimum size of 256 k-bytes. As a consequence, the need for a buffer memory is not truly of trouble.

Figure 2:
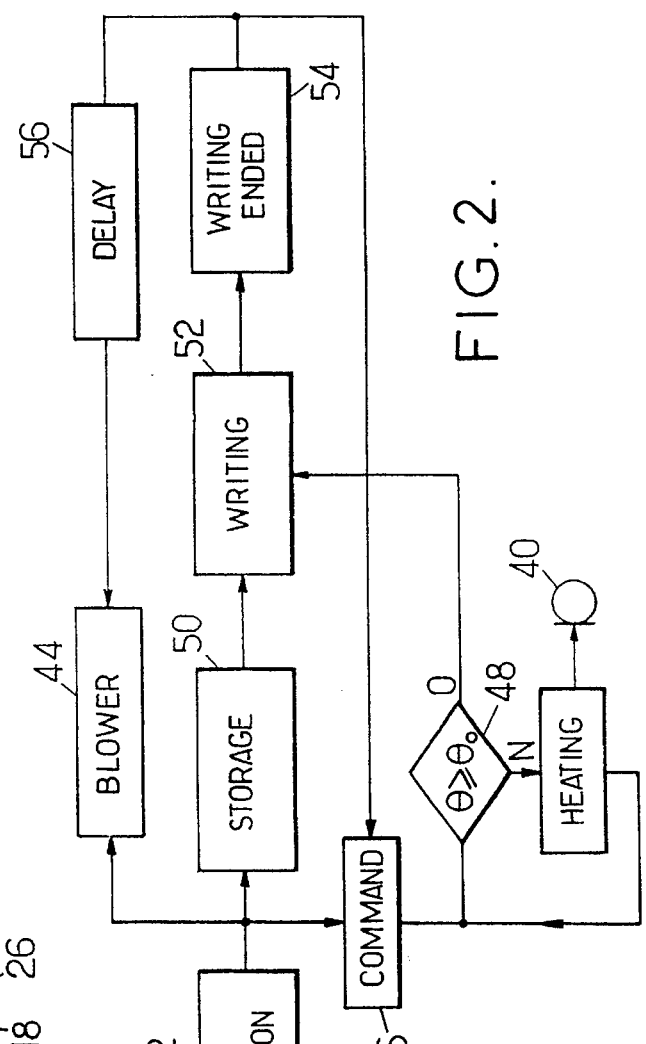
FIG. 2 is a simplified block diagram, indicating elements to be added to a conventional printing device, such as the printing device of FIG. 1, for implementing the invention.

The method may be as schematized on FIG. 2, which may be easily implemented with software or hardware. It only requires adding some components to a conventional facsimile printer. Upon detection of an input call at 42, the electric motor of the blower is automatically energized, immediately or after a delay, by closure of a relay 44. At the same time, pre-heating of the thermal fixing roller begins. Pre-heating is controlled by a loop having an input unit 46 which is enabled by call detection, a test 48 for determining whether the temperature of the drum is lower than $\Theta_0$ and forcing the temperature to increase to $\Theta_0$ if necessary. The blower motor may as well be controlled by a temperature probe.

As soon as the connection protocol has ended, the data are received and stored at 50. Printing 52 begins when test 48 indicates that temperature $\Theta_0$ has been reached. Printing then occurs conventionally, from the stored data.

When all data constituting a message have been received, a "writing finished" sensor disables input control 46, immediately or after a delay of some minutes. The "writing finished" detection signal also stops blower 44, possibly after a delay of some minutes, as indicated at 56. Delaying may be replaced with a stop command delivered when a probe indicates that the temperature of the drum has decreased to a given value. The temperature of the fixing means may be maintained for a predetermined time after end of writing for immediate response if a new call occurs before the end of that predetermined time.

As indicated above, the invention is also applicable to printers suitable for use with micro-computers or home computers, which operate unfrequently.

In all cases, the invention decreases the length of time during which noise is emitted. It also increases reliability of the fixing means and the life of the heater (halogen lamp) since the heater is at the operating temperature only when necessary, rather than continuously. The invention only requires adding some components and possibly adding some instructions to the operating program of the printer.

I claim:

1. In an electro-photographic printing apparatus for forming a latent image on a rotating drum in accordance with received data, for depositing toner on said drum for development and for thermally fixing said image, a method comprising:

upon receipt of an input call, testing whether heat fixing means of said apparatus are at a temperature under a predetermined value;

initiating heating of said fixing means responsive to said receipt for increasing a temperature of said fixing means to said predetermined value if lower than said predetermined value and maintaining said temperature of said fixing means at least at said predetermined value;

storing said received data in buffer memory means as they arrive, immediately after a connection protocol has ended;

initiating formation of a latent image from the stored data, development and heat fixing as soon as said predetermined value is reached;

cutting off said heating after said fixing has been completed; and operating a cooling blower only from said receipt of an input call and until after said heat fixing has been completed.

2. Method according to claim 1, including energizing a motor of said blower as long as the temperature, as detected by a probe, exceeds another predetermined value.

3. Method according to claim 1, including energizing a motor of said blower during said heating and during a predetermined time period after the end of heating.

4. Method according to claim 1, wherein said heating of the fixing means is maintained during a predetermined time duration after end of writing.

5. An electro-photographic printing device comprising:

a light source delivering a light beam;

a photosensitive rotary drum;

means for modulating said light beam and causing said light beam to scan said photosensitive drum axially;

means for transferring electrical charges onto said drum in proportion to an amount of light at each point of the drum;

development means for transferring toner onto said drum in proportion to the amount of light charges on said drum;

means for transferring said toner from said drum to a paper sheet;

means for fixing said toner by pressing said paper and heating it to a predetermined temperature, said fixing means having heating means and a blower for heat removal; and means responsive to an input call for energizing said blower and energizing said heating means until said predetermined temperature of said fixing means has been obtained, for storing input data in a buffer memory as they are received, and responsive to detection that said predetermined temperature has been obtained for initiating operation of said light beam and rotation of said drum, discontinuing said heating after fixing has been achieved and stopping said blower after said heating has ceased.

6. Device according to claim 5, further comprising a temperature probe measuring the temperature of said fixing means and de-energizing said blower when the temperature of said heating means has decreased beyond another predetermined value.

7. Device according to claim 5, wherein said blower is de-energized after a predetermined time period has expired after end of fixing.

8. Device according to claim 5, arranged for maintaining said heating means energized until a predetermined delay has expired from the end of fixing.

* * * * *